United States Patent [19]

Illy et al.

[11] Patent Number: 4,807,762

[45] Date of Patent: Feb. 28, 1989

[54] PROCEDURE FOR SORTING A GRANULAR MATERIAL AND A MACHINE FOR EXECUTING THE PROCEDURE

[75] Inventors: Ernesto Illy, Trieste, Italy; William S. Maughan, Sussex, United Kingdom

[73] Assignees: Illycaffé S.p.A., Trieste, Italy; Gunson's Sortex Limited, London, United Kingdom

[21] Appl. No.: 918,626

[22] Filed: Oct. 14, 1986

Related U.S. Application Data

[63] Continuation of Ser. No. 560,821, Dec. 13, 1983, abandoned.

[30] Foreign Application Priority Data

Dec. 21, 1982 [IT] Italy .............................. 24875 A/82

[51] Int. Cl.[4] .......................... B07C 5/342; G01J 3/46

[52] U.S. Cl. .................................... 209/580; 209/587; 356/425; 364/526

[58] Field of Search ........ 209/576, 577, 578, 580–582, 209/587, 588; 250/226; 356/406–408, 425; 364/525, 526

[56] References Cited

U.S. PATENT DOCUMENTS

| | | | |
|---|---|---|---|
| 3,878,384 | 4/1975 | Bowker | 364/526 X |
| 4,143,770 | 3/1979 | Grimmell et al. | 209/580 X |
| 4,235,342 | 11/1980 | Braham | 209/581 X |
| 4,278,538 | 7/1981 | Lawrence et al. | 209/580 |
| 4,402,611 | 9/1983 | Yuasa | 364/526 X |
| 4,414,635 | 11/1983 | Gast et al. | 250/226 X |

FOREIGN PATENT DOCUMENTS

| | | | |
|---|---|---|---|
| 0025284 | 3/1981 | European Pat. Off. | 209/576 |
| 885287 | 12/1961 | United Kingdom . | |
| 2068535 | 8/1981 | United Kingdom . | |

*Primary Examiner*—Johnny D. Cherry
*Assistant Examiner*—Edward M. Wacyra
*Attorney, Agent, or Firm*—Peter K. Kontler

[57] ABSTRACT

The procedure includes observation of each grain by optic-electronic devices and consists of an initial stage during which several values, representing color signals, are extracted and read and are then processed by a computer to reduce all the signals to two numbers only, defining a pair of coordinates on a plane where the colorimetric characteristics of the grains are represented, and of a second stage in which each grain is automatically classified within an electronic grid, related to the above plane, wherein an operator has already assigned the squares for classes of unacceptable grains. The machine includes an analog-to-digital converter able to convert the analog signals received from the observation devices into binary form, two adapter circuits, a computer and a memory for controlling, sampling and analog-numerical conversion of the color signals, also for storing all samples obtained, as well as for executing the above first and second stages of the procedure.

22 Claims, 9 Drawing Sheets

VARIABLES LIST

Where index K is present, array values are calculated for K=1, K=2 and K=3

| | |
|---|---|
| NR | number of rows |
| NC | number of columns |
| A,C | coordinates generated by SUB 1 |
| AM | maximum value of A |
| CM | maximum value of C |
| I | row number of the requested space |
| J | column number of the requested space |
| POP() | population matrix |
| SORT() | sorting matrix |
| SR(3) | array containing the sum of red values generated by SUB 1 |
| SG(3) | array containing the sum of green values generated by SUB 1 |
| MR(3) | array containing the mean value of red values |
| GR(3) | array containing the mean value of green values |
| IN(6) | sampled values (received from driver) |
| NOMAX | maximum number of samples x grain |
| R(3) | cell containing the sum of sampled values for each channel |
| G(3) | cell containing the sum of sampled values for each channel |
| R | cell containing the sum of R(1) R(2) R(3) |
| G | cell containing the sum of G(1) G(2) G(3) |

REQUEST percentile value
FORECAST percentile value
LEVEL
N = No. of beans observed to create mean values and population matrix (POP)

Fig. 6

MAIN PROGRAM

SUB PROGRAM 1

SUB PROGRAM 2

SUB PROGRAM 3 (continued)

SUB PROGRAM 4

SUB PROGRAM 5

PROCEDURE FOR SORTING A GRANULAR MATERIAL AND A MACHINE FOR EXECUTING THE PROCEDURE

This application is a continuation of application Ser. No. 560,821, filed Dec. 13, 1983, now abandoned.

DESCRIPTION OF THE INVENTION

This invention concerns a procedure for sorting a granular material and a machine for executing the procedure.

The granular material may consist of grain, beans, such as coffee beans, or other beans, nuts and the like but, for the sake of simplicity, the single units composing a batch of granular material will hereinafter be called grains.

The problem often arises of separating out grains possessing certain characteristics from a quantity of their fellows, and processes and machinery have been devised for solving it. The processes and machines already known include those that do this separation when the characteristic, or characteristics making it desirable can be related to the colorimetric characteristics of the grains.

These machines generally comprise: a transfer unit in which the grains move and are given initial propulsion beginning to separate one from another; a chute in which they receive further propulsion and achieve complete separation; an optic observation cell where, having left the chute, the grains pass and are observed by appropriate optic sensors; a control unit that receives from the sensors optic signals related to the color of the grain observed and classifies it as acceptable or not; a device that expels the grains singled out for rejection which have to be diverted away from the flow of good grains.

PRIOR ART

A particularly well known process and machine is that made by the firm Gunson's Sortex Limited of London (G.B.), which can separate grains through observation of two distinct color bands, characteristic of the nature of the material observed, obtained by use of optic filters. This machine has an observation cell in which there is a lighted chamber fitted with optic-electronic observation devices; lighting is supplied by halogen lamps and there are three observation devices in the chamber placed at an angle of 120 degrees on a plane normal to the path taken by the grains through the observation chamber, each device focussing the image of the surface of a grain exposed towards the observation device onto optic sensors, these sensors being able to generate an electronic signal of colorimetric information; each grain that crosses the observation cell passes in front of three appropriately colored backgrounds, each one placed opposite its own observation device; the light reflected by a grain, and by that part of the background not covered by a grain in each of the observation devices, it caught by a set of lenses, split up into two beams of light by a semi-reflecting mirror and, through two optic filters, strikes two optic sensors each capable of generating an electric signal proportional to the quantity of light that has struck it and which hereinafter we will call the color signal.

This light reflected by a grain and by that part of the background left uncovered by a grain will now be called reflected light.

The machine's control unit therefore distinguishes the grains on the basis of six signals it receives from the observation cell; each signal is linearly amplified and all six together are sent to a selector that emits a single signal possessing the same value as that of the highest incoming signal. Distinction between grains takes place when the value of the signal emitted by the selector exceeds a value set by an operator; the comparison between these two values is made by a level comparator which, if a grain has to be diverted, sends an electric pulse to a delaying device of the pulse itself thus allowing sufficient time for the grain due for rejection to arrive at a pneumatic expelling device worked by a solenoid valve set for a previously established time by the above delaying device.

The rejected grains are thus diverted from the normal trajectory of fall and are collected in a separate container.

This procedure and the machine operating it are also able to send, to the above selector, three further signals created by a linear combination of the two electric signals of each of the three observation devices thus forming a further field of classification which the makers have called bichromatic.

An initial drawback to the procedure and machine described above is the fact that the signal transmitted by the sensors is proportional not only to the reflection factor of the grain observed, but also the surface area of the grain observed in the cell, through a window, by each of the observation devices, and since the machine is designed solely for separation according to a reflection factor, the partial proportionality of this factor to the surface area of the grain means a limitation and a lack of accuracy attributable to the procedure and to the machine.

There is a further drawback this being that the three backgrounds to install in the observation cell must be chosen with great care because signals produced by all the grains in the quantity examined must average null, both for electrical reasons inside the machine and because, there being only one classification device for the various observation devices, the signals they generate must be comparable one to another.

A third drawback exists because the machine is unable to make a colorimetric classification of classes of grains unless their colorimetric characteristics are greater or lesser than a certain level of luminosity, so that classes of grains cannot be sorted if they possess colorimetric characteristics of an intermediate nature compard with the characteristics of the whole quantity.

It is further known that the firm Geosource of Houston, Tex., USA, has applied for a patent for sorting machines that include an optic measuring system; the inquirer does not however know either the dates of patents or machines to which they have been applied.

The purpose of this present invention is to reduce or eliminate the above listed drawbacks relating to the machine made by Gunson's Sortex Limited by adopting a computer as a means of control and classification, possibly in a sorting machine such as that made by Sortex for example, without having to make significant changes to the machine's optic-electronic measuring system, or else in a sorting machine whose reflected light is divided into z number of beams that strike a set of z optic sensors contained in each of the n observation devices, it being possible for z to be greater than 2.

PRESENT INVENTION

The procedure conforming to this present invention includes storing the grain batch in a bin or hopper, separating the grains belonging to the batch one from another as by passing the grains along a chute, passing each single grain through an observation cell, observation of each single grain by and number of optic-electronic observation devices, hereinafter called observation devices, within the observation cell lit by halogen lamps, for example, each single grain being observed through a window when it passes in front of an appropriate background placed before each observation device, such procedure therefore being characterized by the fact that it includes an initial stage in which the color signals generated by passage of a grain are sampled, numerically converted and stored, m values being finally obtained for each signal examined, the total of such values being in turn mathematically processed by a computer and reduced to a quantity of numbers equal to z beams of light into which the reflected light is divided, such quantity defining an equal quantity of coordinates on a plane or on a multi-dimensional space of distribution representing the colorimetric characteristics of each grain observed, and further characterized by the fact that, where z equals 2, the procedure includes a second stage in which an observed grain is classified within an electronic grid related to the above plane of distribution in which grid the squares corresponding to the undesired grains have been previously assigned by an operator.

In particular, the first phase comprises an initial subphase in which all the signals supplied by the n observation devices are sampled in succession, converted and stored in a RAM memory in order to generate a group of $n \times z \times m$ numbers supplying the values of the signals generated by the observation devices during passage of a grain through the observation cell, also comprising a second sub-phase in which all the m values relating to one and the same signal are added together to give $z \times n$ values, n of which relate to a first color band, n of which relate to a second color band and so on, according to the z quantity of color bands into which the reflected light is divided, comprising as well a third subphase in which the relative mean value is subtracted from each of the $z \times n$ values generated in the second subphase, such mean value having been previously calculated for each color signal by observation of representative samples of the grains in the lot for sorting, to obtain $z \times n$ standard values. Where z equals 2, a fourth subphase is also included in which each group of standard n values relative to one single color band are added together to give respectively two values indicated by R and V, R being relevant to a first color band and V relevant to a second color band so that R is added to V and then V is subtracted from R to give two final values, A and C, in which $A=R+V$ and $C=R-V$.

In particular again, where $z=2$, during the second phase the computer first estimates to which square of the electronic grid, related to the plane on which the above values A and C are disposed, the pair of coordinates, calculated in the first phase of the process, correspond and it then checks the value contained in the square to decide whether to accept or reject the grain observed. Identification is further made in the computer of the grid squares corresponding to grains to be rejected in accordance with the sorting which the operator carries out using the possible options offered by the machine. Again, the process can also forecast the percentage of grains the sorting machine will reject according to the type of sorting selected by the operator. This forecast can be made by preliminary observation of a sample that is statistically typical of the colorimetric characteristics of the quantity to be observed.

The machine for executing the invented process, where $z=2$, is able to make decisions based on the above two coordinates; it includes a sorter fitted with devices for separating out the grains in a quantity one from another, an observation cell lit by halogen lamps containing n observation devices, each associated to an appropriate background, capable of generating appropriate signals according to the colorimetric characteristics of each grain observed, a classifier and a device for expelling the undesirable grains. The machine is characterized by the fact that the sorter is related to an analog-numerical converter for converting the analog signals received from the sorter's observation devices into the most appropriate binary form; that it is related to an adapter to render logical a signal transmitted by the sorter to indicate the presence of a grain in the field covered by the observation devices, able to receive from a computer a signal for expelling a grain and to pass that signal to the sorter having made such signal electrically compatible with the electric circuit of the sorter; that it is related to a computer able to receive from the adapter a signal indicating the presence of a grain in the field covered by the observation device, which through the analog-digital converter, can sample and store a certain number of signals sent by the sorter until the above signal denoting presence of the grain indicates that it has passed out of the observation device's field of observation, that can execute the above initial pre-processing phase and can therefore execute the second phase of automatic classification to decide whether or not the observed grain is acceptable and, if not, that can operate the sorter to have the grain expelled, but if acceptable, can await the next grain and begin a fresh cycle; that it is related to a control panel permitting the operator to interact with the sorter-computer system when a program has been loaded into the latter for executing the operations described above.

It is clear that grain classification can only be done if the grid plane (A,C) contains all the information needed to distinguish the acceptable from the unacceptable grains.

To set up the above electronic grid, the operator uses the following options offered by the machine:

1. sorting by lighter colored grains,
2. sorting by darker grains,
3. sorting by grains in which the first color band prevails,
4. sorting by grains in which the second color band prevails,
5. sorting by irregularities in grains,
6. sorting by self-teaching
7. programmed sorting.

In the first five cases the operator uses the computer's ability to classify by instructing it for the type of sorting he decides to do, and for the desired percentage of rejects.

In the sixth case the operator hand picks a number of grains he considers typically unacceptable and shows them to the machine so that it can memorize their colorimetric characteristics on the grid and later be able to recognise them.

In the last case the operator arbitrarily decides which squares of the grid shall be rejection squares corresponding to unacceptable grains.

The choice of a sorting criterion does not exclude but rather is added to the result of the previous choices in such a way that several options can be carried out simultaneously.

As explained before, in order to develop these capabilities for automatic classification, the computer first asks to see a sample statistically representative of the whole quantity (hereinafter called the representative sample) to be sorted so that the parameters needed for the subsequent operative stage can be processed (e.g. the mean initial values of the various signals), and so that a statistical model reproducing on the (A,C) plane all the colorimetric characteristics of the above quantity can be formed in the computer's memory.

The advantages of having the observed grains represented on the plane where the A,C values are disposed consist both of better detection of the colorimetric characteristics of the grains irrespective of their positions when in the observation cell, and of easier identification of characteristic classes in the quantity of grains under examination.

Particularly as regards the method used for calculating the A and C values, summation signal-by-signal of the acquired values minimizes any measuring errors due to the way in which the grain presents itself in the observation cell, relatively to the rotations round the optic axis of the observation device; this is clear if we consider that the summation provides information about the total energy reflected from the surface of the grain viewed by the observation device concerned.

Subtraction of the mean value from each of the above summations avoids the need for putting into the machine a background having chromatic characteristics such as would generate signals averaging null, and further reduces the effects caused by variations in the level of efficiency of one observation device compared with another, since the common reference for the various observation devices is the "average" grain in the whole batch. Further, as the origin of the axes of the electronic grid always coincides with the centre of gravity of distribution of the batch, the computer can function with a smaller memory.

The summations of the values thus obtained in the single color bands (R and V values) minimize measuring errors caused by the way the grain lies in the observation cell in relation to rotations around the grain's line of fall, since, by adding together the results obtained simultaneously by the three observation devices, we get information about the total surface of the grain so long as the observation devices are placed in a position that will enable them to view the entire surface of the grain as it passes in front of them.

Finally, the method of obtaining A and C values by linear combination of R with V assists the automatic identification of classes in the whole batch (most important from the aspect of colorimetric sorting) composed of the darker grains, of the lighter ones and of those in which one color band prevails rather than the other.

Regarding the advantages obtained by preliminary observation of a typical sample of the grains contained in a batch to be sorted, by means of which the computer makes and stores a statistical model of its colorimetric characteristics, these consist both in enabling the computer to forecast the quantity of grains that will be expelled in fulfilment of the operator's requests for rejection, and in the ability to recognise and thus automatically expel grains (or foreign bodies) differing from those that on an average make up the whole batch. This characteristic covers the slight probability that extraneous objects or faulty grains will appear in a batch consisting mainly of good ones.

The advantages accruing from use of an electronic grid covering the plane in which A, C values are disposed—as a method of sorting grains into acceptable or unacceptable—consist both in the extreme rapidity with which the grain in the batch under observation can be classified and in the possibility of expelling grain whose disposition in the plane of A, C values is geometrically undefinable, as well as in the ability of the computer to observe and store the colorimetric characteristics of grains belonging to classes that must be expelled.

One embodiment of how the invention may be practiced is shown in diagrammatic form in the drawings.

THE DRAWINGS

Figure 7:
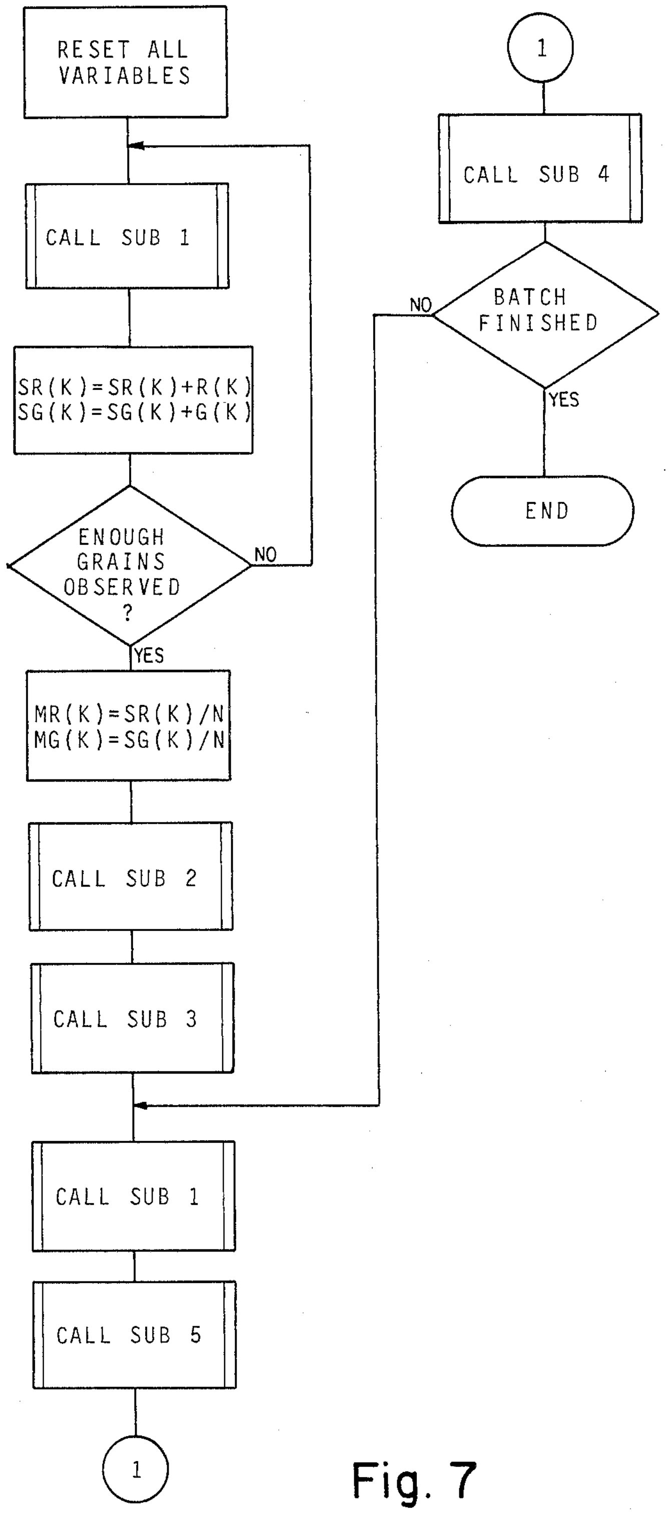
Figure 8:
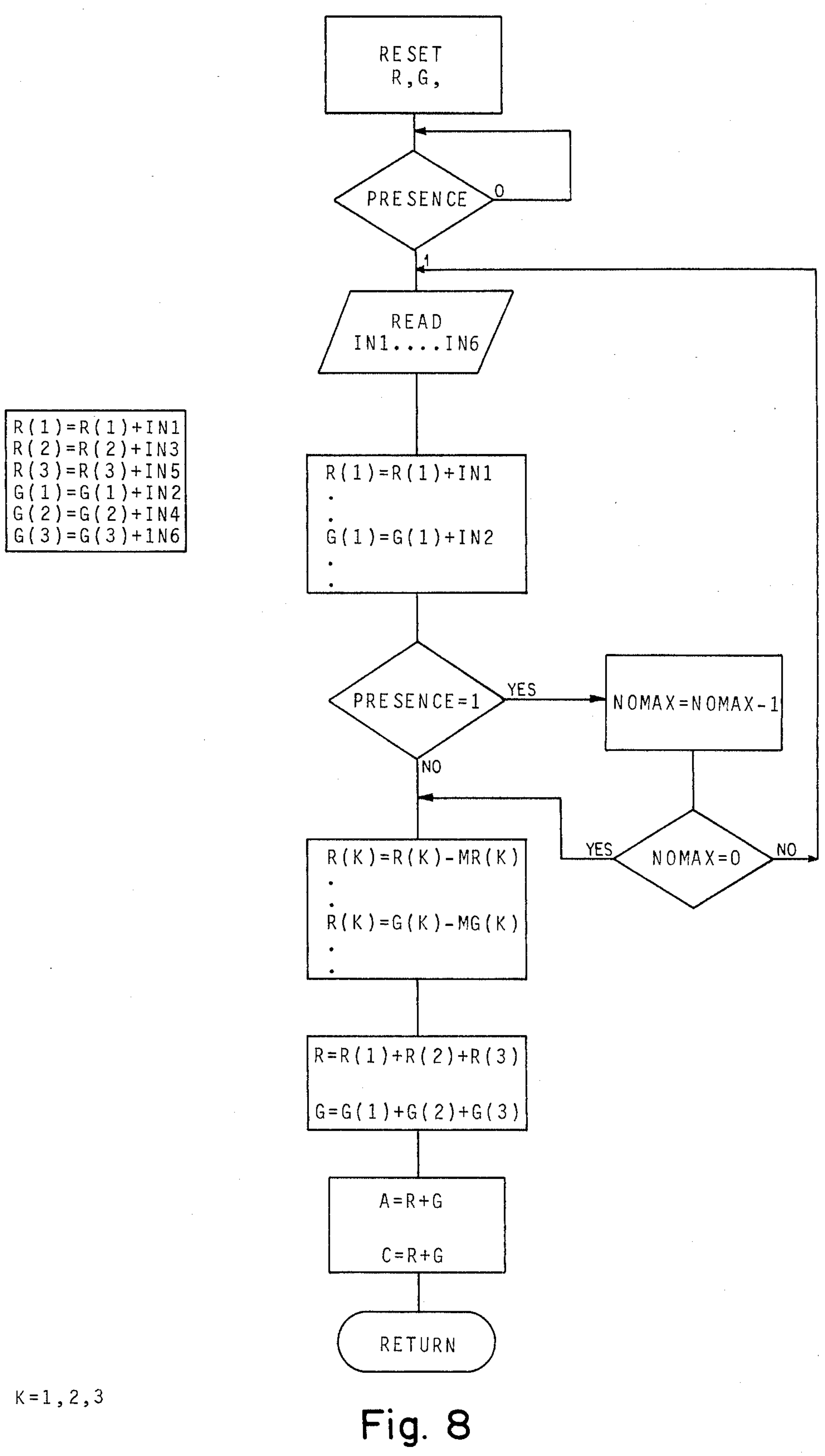
Figure 9:
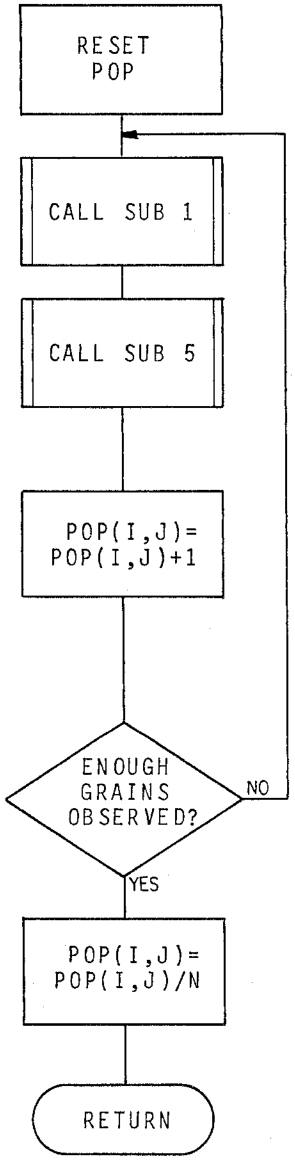
Figure 10:
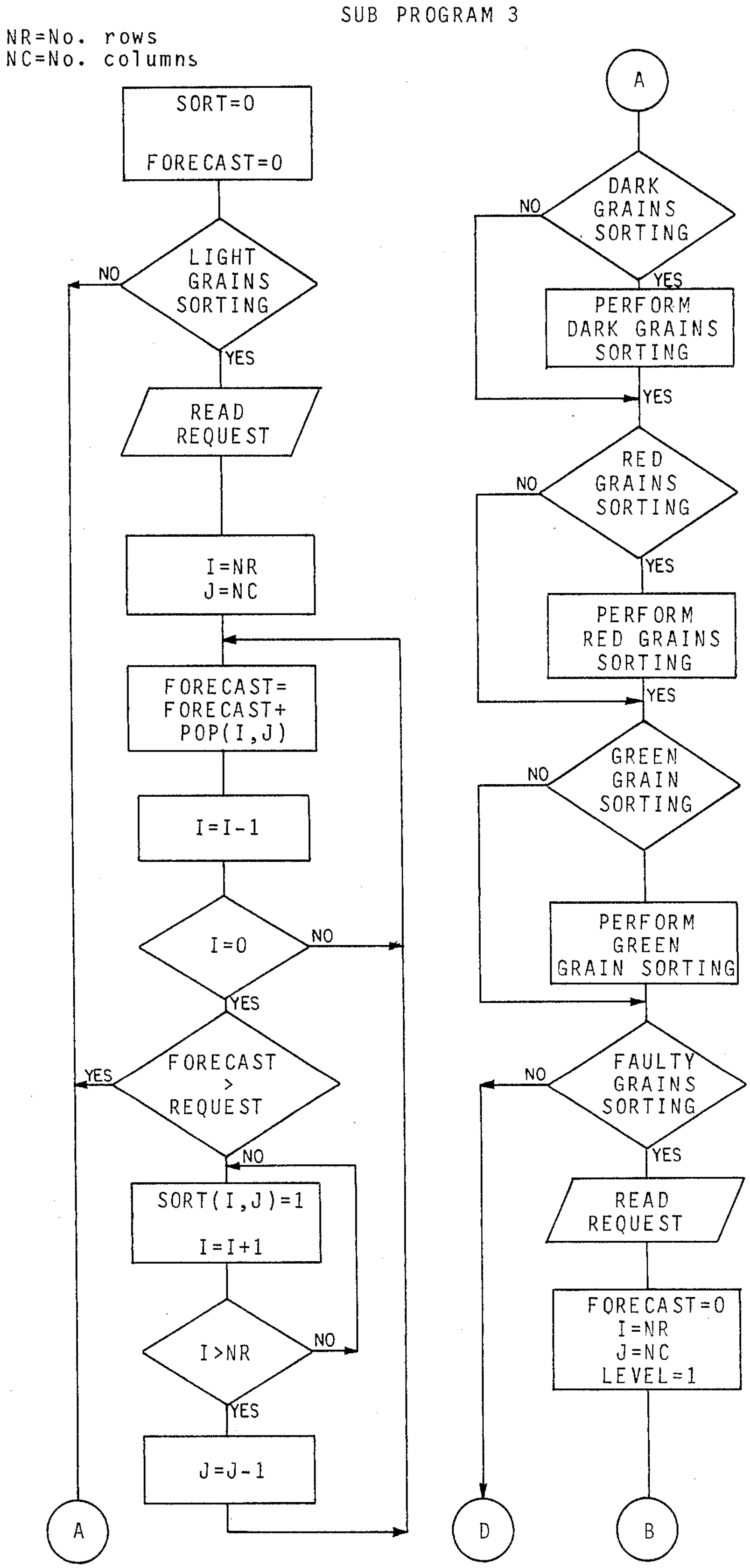
Figure 10:
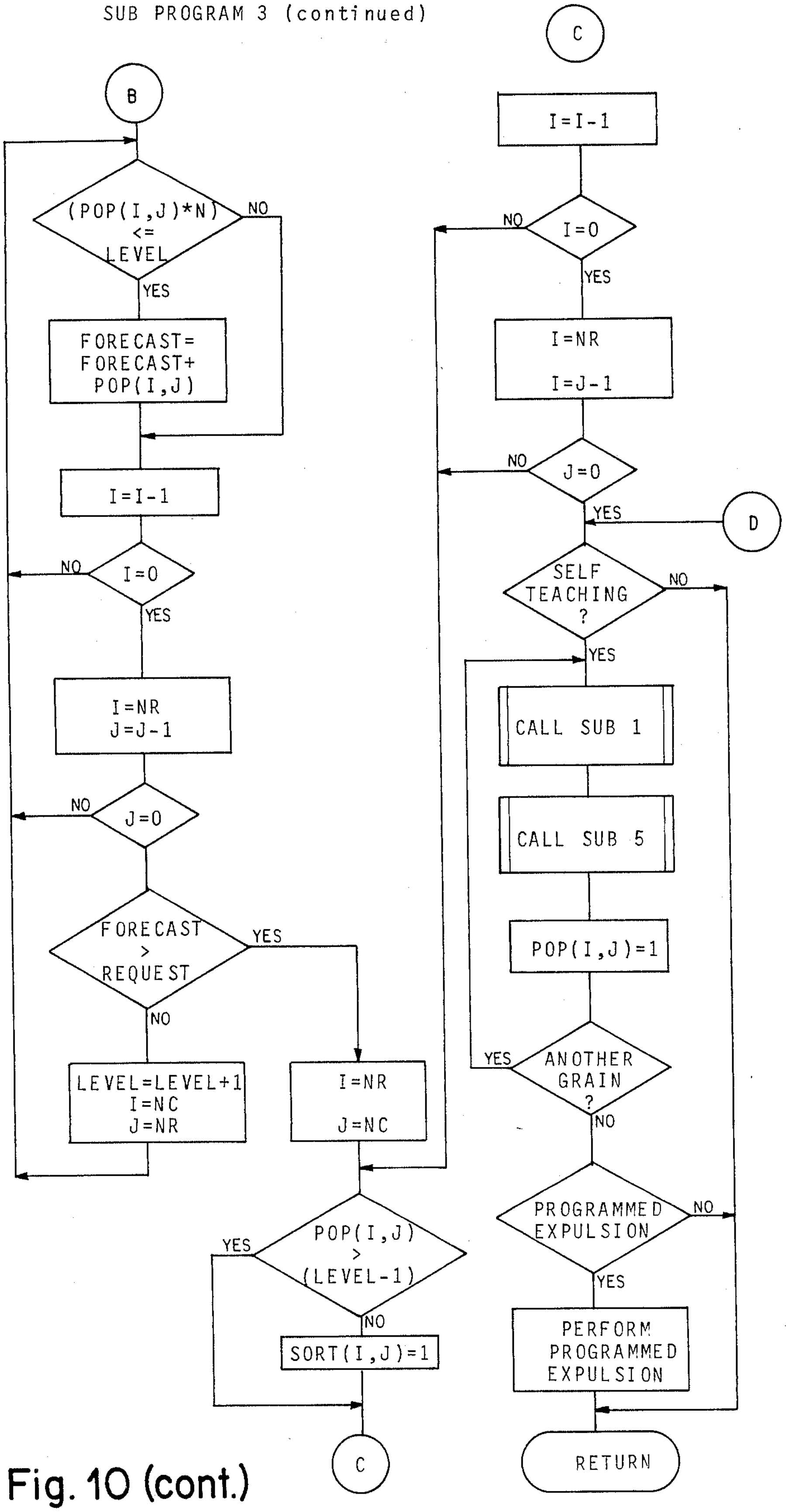
Figure 11:
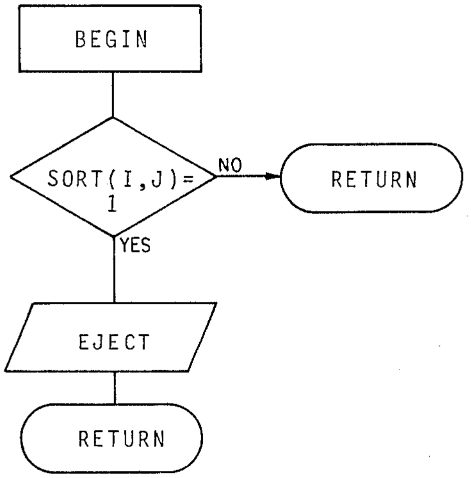
Figure 12:
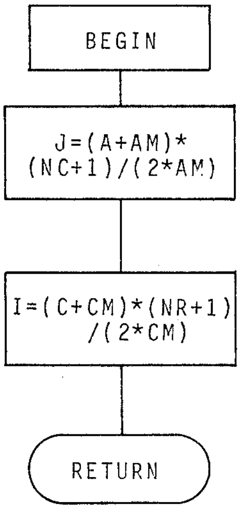

FIG. 6 sets forth a list of variables for use in flow diagrams of computer programs which may be employed for a method and an apparatus according to the invention;

FIG. 7 is a flow diagram of a main computer program for controlling a method and an apparatus in accordance with the invention;

FIG. 8 is a flow diagram of a first sub-program for use with the main program of FIG. 7;

FIG. 9 is a flow diagram of a second sub-program for use with the main program of FIG. 7;

FIG. 10 is a flow diagram of a third sub-program for use with the main program of FIG. 7;

FIG. 11 is a flow diagram of a fourth sub-program for use with the main program of FIG. 7; and FIG. 12 is a flow diagram of a fifth sub-program for use with the main program of FIG. 7.

DESCRIPTION OF THE PREFERRED EMBODIMENTS

Figure 1:
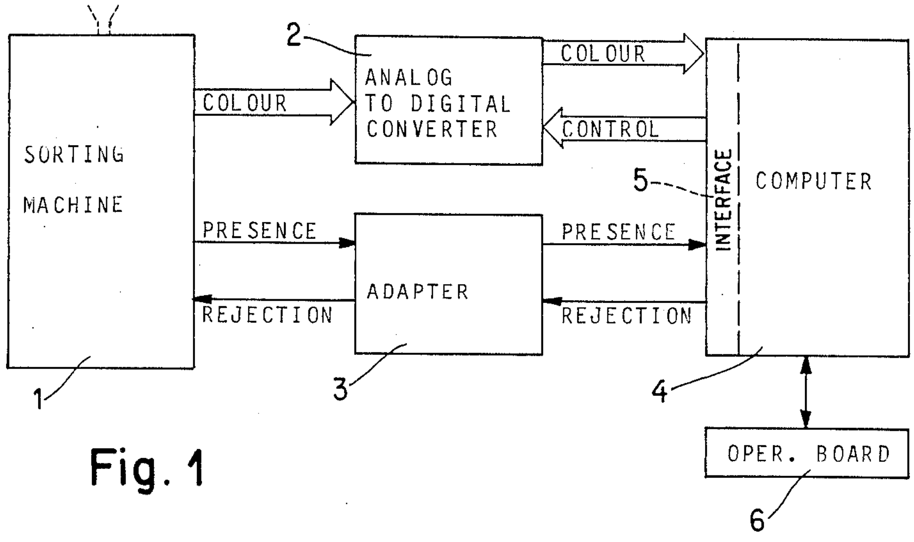
FIG. 1 is a diagrammatic layout of a machine following the teachings of the invention.

FIG. 1 shows the following: device (1) is the Sortex model 1121 sorter able to observe one grain at a time, to generate the right color signals and, if necessary, expel the undesired grains from the batch.

Six color signals are taken from the Sortex 1121 sorter for each grain observed, two signals from each observation device—also called an "observer"—in the observation cell.

Since these are analog signals (continuously variable over time) while the computer is numerical, the analog-numeric converter device (analog to digital computer), (2) converts the signals at its input into the binary numerical form required by the computer.

Another analog signal called "presence", which can show when a grain lies in front of the observers, is sent to the computer through device (3) which renders a logic and electrically compatible signal to the computer.

Device (3) also receives from an electronic computer (4) the signal for expulsion and passes it to the Sortex 1121 sorter having first made it electrically compatible with the circuitry of the machine.

The sequence of operations is as follows: the computer waits for the logic level of the presence signal to indicate arrival of a grain in the observation cell, then it begins to sample and memorize a certain number of signals, preferably six, until the presence signal indicates that the grain is no longer in front of the observers.

This marks the start of the first phase of pre-processing of samples and the second phase of classification of the grain observed, at the end of which the computer is in a position to decide whether the grain is acceptable or not.

If it is unacceptable, the computer, through the expulsion signal, has the grain expelled; if however it is acceptable the expulsion signal is withheld. The computer is ready for the next grain and for starting a fresh cycle.

The computer directs a number of logic signals for control of the analog-numerical conversion circuit. It generates one signal for initiating sampling and conversion sequence, six signals for addressing the signal to be sampled, and receives a signal indicating that conversion has been made.

The functions of the device here described are preferred as to ensure collection of an adequate number of samples per grain to avoid loss of colorimetric information.

In the case of the machine now being considered this means a sample frequency of 4 kHz for example, for each color signal.

Device (4) is the computer which, in accordance with the specifications given in detail below, can process the samples obtained by conversion of the color signals, and can generate an expulsion signal if required.

Device (6) is that part which enables the operator to converse with the computer by use of a video terminal or keyboard, for example.

More particularly, the electronic computer (4) used in this present invention, is model 2113E made by Hewlett Packard (U.S.A.) whose main features consist of:

- a word of 16 bits,
- number of machine instructions: 128
- number of registers 10,
- direct memory access (DMA),
- maximum capacity of central store of 1024K words,
- microprogrammable (211 instructions),
- ability to operate with "interrupt" up to 46 input-output units.

The operator board (6) is a video terminal by Hewlett Packard, model HP2645A, connected to the main computer by an RS232-C asynchronous serial line operated in the computer by an HP12966 interface.

The electronic computer (4) is also fitted with a disk storage (required for using this particular operative system) type HP7905A, having a total capacity of 15 megabytes, with interface, also with an interface (5) type HP12489 which, with its 16 logic lines (TTL) for input and 16 for output, is used as a control circuit for the analog to digital converter, as a receiver of the "presence" signal and as a generator of the expulsion signal.

As a data conversion device (2) use has been bade of the DAS 1128 integrated data conversion system made by the U.S. firm Analog Devices which can receive up to 16 analog inputs and which has a resolution of 12 bits, a programmable field of measurement of from 0,+5 volt up to −10,+10 volt and a sampling and conversion time of 40 microseconds.

Figure 2:
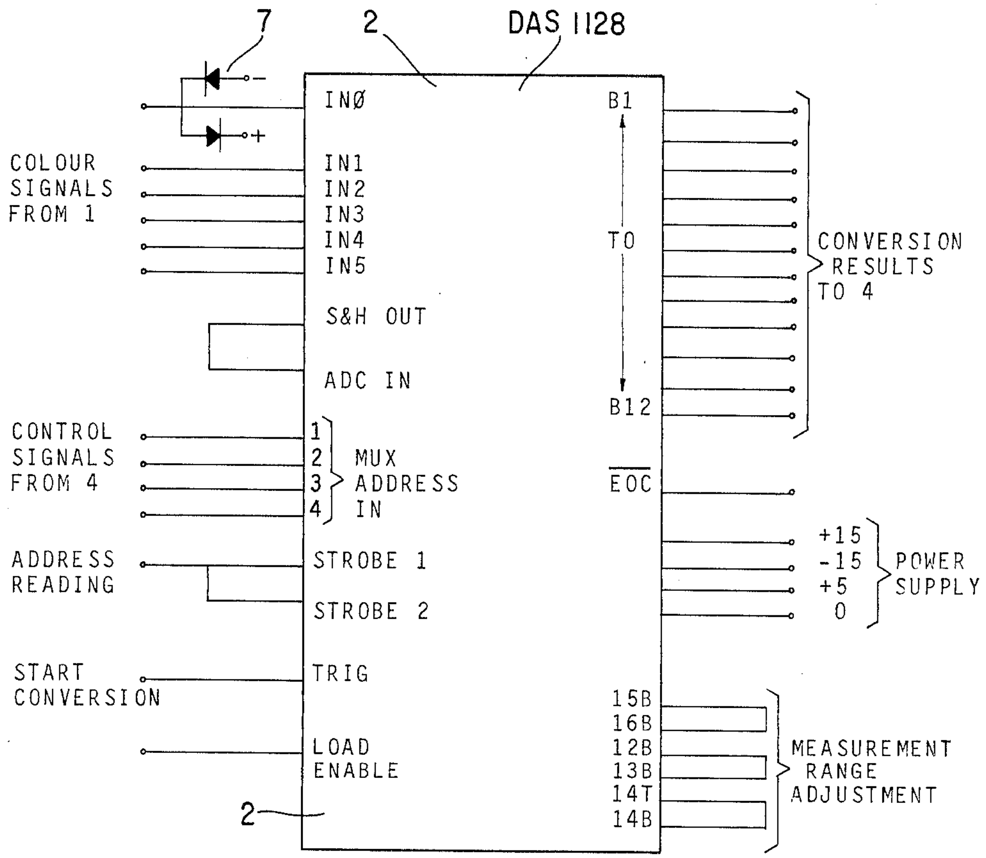
FIG. 2 is a diagram of the analog to digital converter shown in block form in FIG. 1.

FIG. 2 shows the wiring of the DAS 1128 analogic-numerical converter (2): the analog inputs IN1–IN5 are connected direct to the color signals sent out by the SORTEX 1121 observation devices, namely at the input of the level comparator that activates the ejector; (7) indicates two diodes for overload protection; the sampling circuit output (S&H OUT) is connected to the input of the numerical converter (ADC IN); the logic control inputs of the DAS 1128, namely MUX ADDRESS IN 1,2,3,4, STROBE, TRIG, LOAD ENABLE are connected to the same number of logic outputs of interface (5) mounted on the computer, while the end-of-conversion signal EOC and the 12 bits of conversion result B1–B12 are connected to the same number of input lines to interface (5).

Worked by an appropriate computer program known as DRIVER, the operational sequence for acquiring a color signal, carried out with interface (5), is as follows; the LOAD ENABLE line is cleared, the binary address for the sampling signal is set on the four MUX ADDRESS IN lines and the STROBE is cleared so that the address can be stored in the internal memory of the analog-numerical converter (2), DAS 1128, the STROBE and LOAD lines are returned to the logic state one and the TRIG line is cleared to make way for sampling and subsequent conversion of the chosen signal.

Having returned the TRIG line to a logic state, and after the end-of-conversion signal EOC has passed to state one, showing that the measuring sequence is completed, all the computer has to do is to store the binary value of the acquired information which automatically appears on lines B1–B12 connected to interface (4).

A configuration has been given to DAS 1128 to enable it to convert to 12 bits in a measuring field of −5.12,+5.12 volt so that its resolution is 2.5 m volt.

Figure 3:
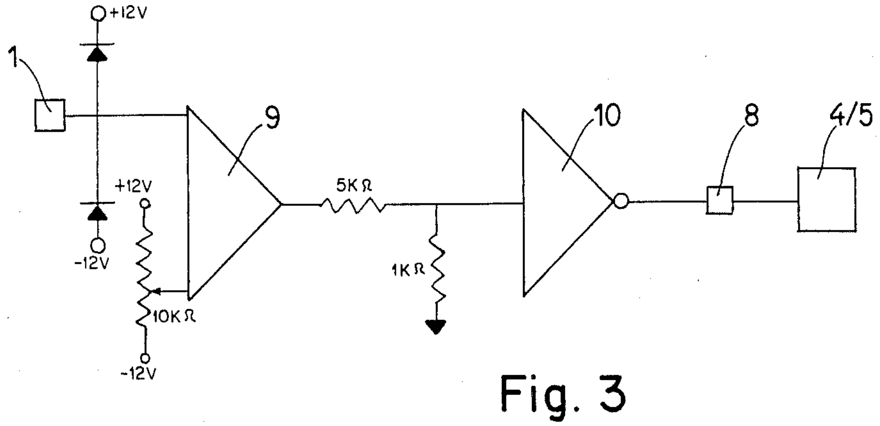
FIGS. 3 and 4 are diagrams of the interfaces for the signals, respectively indicating presence of the grain and expulsion, given by the adapter shown in block form in FIG. 1.
Figure 4:
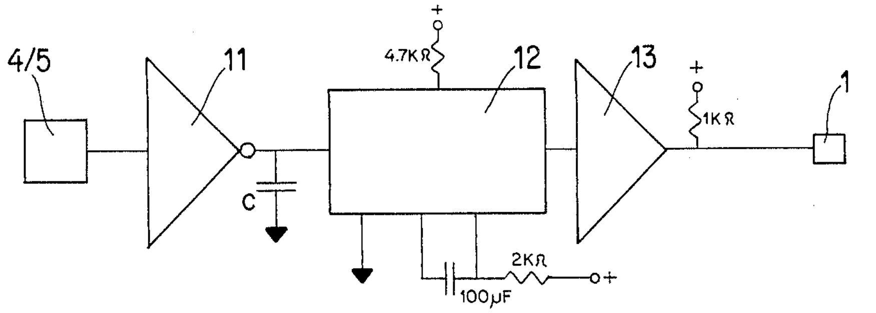

Device (3) in FIG. 1, whose task is to render the presence and expulsion signals electrically compatible between the computer and the sorter, has been constructed as shown in FIGS. 3 and 4. FIG. 3 gives a diagram for generating the "presence" signal (8): the analog signal known as CLAMP is taken from inside the Sortex 1121 sorter (1) and is sent to an adjustable level comparator (9) made with a type LM324 operational amplifier, a product of National Semiconductor Corporation, the output of which passes, by means of a resistive divider, through an integrated circuit (10), type 7404, that reverses its logic state and makes it electrically compatible with interface (5) situated in the computer (4), to which it is connected.

FIG. 4 gives a diagram for generating the expulsion signal. The expulsion signal is applied to an output line of interface (5), is passed to the intergrated circuit (11), type 7404, that inhibits its logic state, after which it passes to the input of a monostable integrated circuit (12) type 74123, made by Texas Instruments Corporation, whose task is to make the pulse last for about 100 microseconds; through a 7407 integrated circuit (13) with an open collector output, which circuit amplifies its current, the signal then goes to the drive circuit of the solenoid for expulsion mounted in the sorter (1).

The program executed by the machine described consists of a main program and five sub-programs:

main program: this controls execution of the sub-programs according to the correct sequence of operations;

sub-program 1 samples the color signals and calculates the (A,C) values;

sub-program 2 processes the statistical characteristics of the batch to be sorted (based on the sample observed);

sub-program 3 converses with the operator to establish, in the (A,C) plane, the characteristics of the classes of grains that must be rejected;

sub-program 4 classifies the grain observed and rejects it if necessary; and, sub-program 5 calculates, based on the (A,C) coordinates, the indices of the square in the grid which corresponds to I=line index, J=column index.

Hereinafter "sub-program" will be termed "SUB".

Main program

The main program has to direct execution of the various sub-programs in such a way that a logical sequence of operations is observed.

It can also give technical supervision to the working of the machine through this function is not described here.

When the machine is turned on the program starts. The first step is to switch on the sorter (1);

(a) clear all cells in the memory, (b) execute SUB 1 (acquisition), (c) to each of the six cells containing totals, add all the values acquired from the corresponding signal, (d) if enough grains have been observed, turn to (e); if not, to (b), (e) calculate the mean values of the acquired values dividing the cells of totals by the number of grains observed.

(f) execute SUB 2 (statistics of the batch), (g) execute SUB 3 (this constructs the classifier, i.e. the grid), (h) execute SUB 1 (acquires a grain and calculates (A,C)), (i) execute SUB 5 (calculates I,J indices), (j) execute SUB 4 (classifies and expels if necessary), (k) if the batch is finished, turn to (1); if not, to (h), (l) end.

Sub-program 1

This samples and stores the various color signals from the moment a grain enters the optic field of the observers until is passes out of it; it then calculates the (A,C) values based on those acquired.

The algorithm is as follows:

(a) read the logic state of the "presence" signal, (b) if the "presence" signal is 1, go to (c); if it is 0, go to (a), (c) sample, convert and serially store the (six) color signals, (d) read the logic state of the "presence" signal, (e) if the "presence" signal is 1 go to (c); otherwise to (f), (f) add the samples relating to the same signal together and store the results, (g) subtract the mean values calculated under (e) in the main program from the results obtained under (f), (h) add up the results from (g) and put the resulting value into square "A", (i) add up the results from (g) relating to "green" and store the result, (j) add up the results from (g) relating to "red" and store the result, (k) subtract the value obtained in (i) from that of (j) and store the result in square "C"

(l) return to the program that made the request.

Sub-program 2

This program analyzes statistical distribution of a representative sample and then stores it.

Similar to that used in the classifying stage (SUB 4), this representation consists of a rectangular matrix; the column number of one of its squares depends on the value of A, and the line number on the value of C.

In the above matrix each square contains a number that represents the relative frequency, or characteristic, of the grains in the typical sample with (A,C) values corresponding to that square.

This matrix, generated by sub-program 2, hereinafter called "population map" enables the computer to recognise automatically certain classes of grains and also, when details of rejection are being decided, to forecast the percentage of rejects to suit the request made by the user.

The algorithm is the following:

(a) execute SUB1 (acquisition), (b) execute SUB 5 (this calculates I,J), (c) increase by 1 the contents of the (I,J) square in the population map, (d) if enough grains have been observed go to (e); if not, go to (a), (e) convert the contents of squares in the population map into their relative frequencies, (f) return to the program that made the request.

Sub-program 3

Complying with the requests made by the operator of the sorter, this program constructs a matrix, similar to the population map, in which the squares corresponding to grains to be rejected from the batch are marked.

The final result is therefore a matrix that covers the color plane (A,C) in the same way as the population map, but in which each square contains either number one or zero according to whether the grains with corresponding colorimetric characteristics are acceptable or unacceptable.

The operator has available seven different modes for instructing the machine about the grains he wants to be rejected from the batch:

1. expulsion of light colored grains
2. expulsion of dark grains
3. expulsion of red grains
4. expulsion of green grains
5. expulsion of faulty grains
6. expulsion by self-teaching
7. programmed expulsion When the first five of these modes are used the operator must specify as well as the percentage of grains he wants to have rejected; for example he can request rejection of a quantity of dark grains amounting to 3% of the batch.

As, while the machine is receiving instructions about the quantity to reject, appropriate changes are being made only to the related part of the "sorting map", the operator can simultaneously use all the above seven modes of classifying rejection as well.

Figure 5:
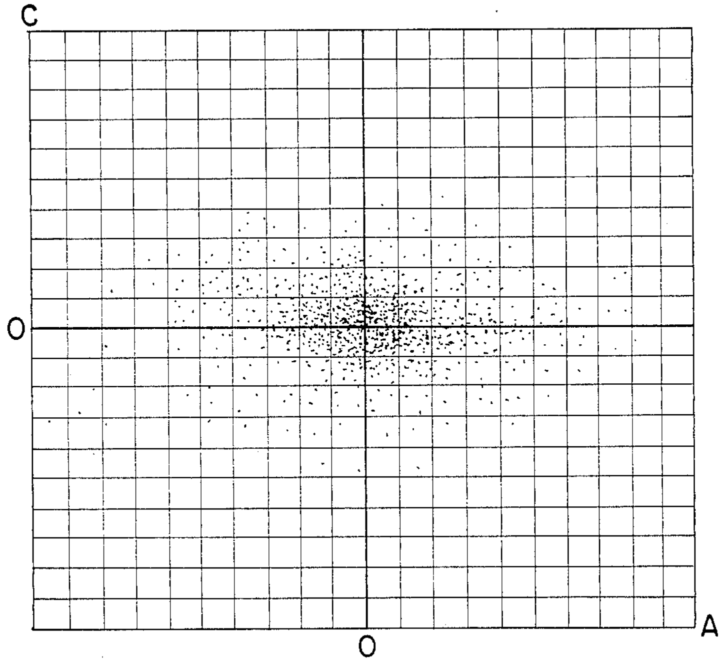
FIG. 5 is an example of disposition, over a plane of A, C values of a typical sample taken from a quantity of coffee beans, and shows an electronic grid associated with the above plane.

The first five modes are based on the structural characteristics of the (A,C) plane in which axis A (see FIG. 5) represents mean luminosity of the grain observed, so that the lighter colored grains are represented on the positive side and the darker ones on the negative side, while axis C represents color information so that the redder grains in the batch are on the positive side and the greener ones are on the negative side.

The origin of the (A,C) axes always lies on the barycentre of distribution because of the standardizing operation executed in SUB1 under (g).

The fifth mode also makes appropriate use of the relative frequencies contained in the population map in order to identify the grains that probably will not exist since, being "different" from most of the grains in the batch, they are generally considered as faulty grains.

When using the sixth mode, however, the operator must be able to show the sorter some examples of the kinds of grains he wants to have rejected. In that case the machine stores their position on the (A,C) plane in the "sorting map" so that it will be able to recognise similar grains during the subsequent stage of sorting them.

With mode seven the operator can himself program the squares on the sorting map corresponding to the grains to be rejeced, by indicating the recognition number of the square to the computer. Using this mode it is possible to program a type of sorting appropriate for the most general kind of case.

As the first five modes are all similar, to simplify matters only the first and the last of them are described here.

The algorithm is as follows:

(a) if the operator has requested sorting by light colored grains continue; otherwise proceed to (i),
(b) store the expulsion percentage set by the operator in the REQUEST square,
(c) move the pointer over to the farthest right-hand column of the population map and clear the FORECAST square,
(d) total up the contents of all squares in the chosen column, then add to that the result in the FORECAST square,
(e) if the contents of the FORECAST square are greater than that of REQUEST, proceed to (i); otherwise continue,
(f) mark all squares of the column indicated by the pointer in the sorting map with number one (rejection),
(g) move the pointer one column to the left,
(h) proceed to point (d),
(i) (continue with the other methods of instruction). (start the method for self-teaching)
(p) if the operator requests the self-teaching mode, continue; otherwise proceed to (u),
(q) execute SUB 1 (acquisiton),
(r) execute SUB 5 (calculate I,J),
(s) on the sorting map, square (I,J) is made equal to one (unacceptable),
(t) if the operator notes the end of the same proceed to (u); otherwise to (q),
(u) return to the program that made the request.

Sub-program 4

This program classifies the grain observed in acceptable or unacceptable according to what the (I,J) square in the "sorting-map" contains.

If it is classified as unacceptable (square=1) a pulse is generated when works the sorter's expulsion devivce; if it is acceptable nothing further is done.

The algorithm is as follows:

(a) read the contents of the (I,J) square in the "sorting map",
(b) if this=0 go to (d); otherwise proceed,
(c) a grain expulsion signal is generated,
(d) return to the program that made the request.

Sub-program 5

This calculates the line number I and the column number J of the square in the "population map", and in the "sorting map", corresponding to a certain pair of values (A,C) calculated by the sub-program 1.

From the program's point of view these maps and rectangular matrices for each square of which there are two numbers called indices which indicate the line number and column number of the square.

These numbers suffice to identify each square in the matrix.

Hereinafter the following initials will be used;

NR : number of the lines in the matrix,
NC : number of columns in the matrix,
A,C : coordinates generated by SUB 1 following observation of a grain,
AM : maximum value of A obtainable in absolute value,
CM : maximum value of C obtainable in absolute value,
I : line number of the requested square,
J : column number of the requested square.

The algorithm is as follows:

(a) calculate the column index by means of the formula:

$$J=(A+AM)\times(NC+1)/(2\times AM),$$

(b) calculate the line index by means of the formula:

$$I=(C+CM)\times(NR+1)\ /\ (2\times CM),$$

(c) return to the program that made the request.

All the programs and sub-programs described above are written in the computer language known as FORTRAN IV except for the DRIVER part of interface HP 12489 which is written in ASSEMBLER language.

The HP2113E computer has been used with an RTEIV-B real time operative system supplied by Hewlett-Packard.

Sub-program 1 will now be given as an example executing sampling of the color signals generated by a grain when passing through the observation cell, and afterwards calculating the coordinates (A,C).

The control of the DAS1128 converter has requested that a suitable driver be drawn up, able to realize with the maximum possible efficiency the operations of acquisition of the signals or expulsion of the unacceptable grain.

In the following example, the instruction

```
CALL EXEC (1, KLU, IBUF, NCMAX)
```

corresponds to a request for acquisition, and storage in the IBUF vector, of data relating to the next grain that will appear in the observation cell, while an instruction like

```
CALL EXEC (2, KLU)
```

corresponds to a request for expulsion.

Sub-routine scan:

```
C  This sub-routine makes the call to the operative
C  system needed for complete acquisition of a grain and
C  from the acquired data calculates the A and C values
C  that are representative of the grain.
C  The mean values of each channel, necessary for standard-
C  izing the data, are in the MEDIA vector.
C  The data in the various vectors are organized as follows:
C  R = red, V = Green
      1          2            3              4             5            6
C  R.LEFT - V.LEFT - R.CENTRE - V.CENTRE - R.RIGHT - V.RIGHT
INTEGER A,C
COMMON MEDIA (6) A,C
DIMENSION IBUF (181), IDATA ( 30,6), ISUM (6)
EQUIVALENCE (IBUF (2), IDATA)
C  DEFINES DRIVER PARAMETERS
KLU = 19 + 100B
NOMAX = 20
C  CLEAR VECTOR SUMS
   DO 50 I = 166
   50 ISUM (I) = 0
C  EXECUTES REQUEST ACQUISITION
   CALL EXEC (1, KLU, IBUF, NCMAX)
C ACQUISITION COMPLETED
C IBUF (1) = NUMBER OF SAMPLES MADE PER CHANNEL
C THE REST OF THE IBUF VECTOR CONTAINS SERIALLY ACQUIRED
C DATA
C CALCULATE THE SUMMATIONS AND NORMALIZE THE DATA
  DO 100 I = 1, IBUF (1)
DO 100 J = 1, 6
100 ISUM (J) = ISUM (J) + IDATA (I,J)
  DO 200 J = 1.6
200 ISUM (J) = ISUM (J) − MEDIA (J)
C CALCULATE THE COORDINATES A AND C
A = ISUM (1) + ISUM (2) = ISUM (3) + ISUM (4) + ISUM (5) + ISUM (6)
C = ISUM (1) − ISUM (2) + ISUM (3) − ISUM (4) + ISUM (5) − ISUM (6)
RETURN
END
```

Although the present invention has been described employing certain identified off-the-shelf components, it will be obvious to those skilled in the art that substitutions of components may be made and still practice the invention disclosed and claimed herein.

What is claimed is:

1. A method for sorting granular materials from a supply in accordance with surface characteristics as measured with a plurality of individual grain observation devices, each of which generates amplitude values related to the intensity of a colour reflected from an individual grain, comprising the steps of:

- passing individual grains from the supply one after another past the grain observation devices to generate from each thereof a plurality of measured amplitude values related to the intensity of a colour reflected from an individual grain;
- generating standard amplitude values for different colours reflected from a representative grain of the supply;
- combining, for different colours reflected from a grain and detected by a device, the plurality of measured amplitude values associated with a column grain and a common colour to form measured mean amplitude values for the respective colours detected by the observation devices;
- determining the differences between said standard amplitude values and corresponding colour related measured mean amplitude values to derive deviations of the measured mean amplitude values relative to said standard values as a function of colour for the grains in the supply;
- adding the mean amplitude values associated with a common grain but for first and second different colours to form a first coordinate value;
- forming the difference between said mean amplitude values associated with the common grain for said first and second different colours to form a second coordinate value; and
- repeating said adding and forming steps for other grains and recording said first and second coordinate values for the grains passed through the observation devices.

2. The method for sorting granular materials as claimed in claim 1 wherein the step of generating standard amplitude values comprises the step of:

- combining a plurality of measured amplitude values associated with different colours of the representative grain to form mean standard amplitude values respectively associated therewith; and
- wherein said difference determining step is done between the mean standard amplitude values and corresponding colour related measured mean amplitude values.

3. A method for sorting granular materials from a supply in accordance with surface characteristics as measured with a plurality of individual grain observation devices, each of which generates amplitude values related to the intensity of a colour reflected from an individual grain, comprising the steps of:

- passing individual grains from the supply one after another past the grain observation devices to generate from each thereof a plurality of measured amplitude values related to the intensity of a color reflected from an individual grain;
- combining, for different colours reflected from a grain and detected by a device, the plurality of measured amplitude values associated with a common grain and a common colour to form measured mean amplitude values for the respective colours detected by the observation devices;

repeating said combining steps for each of the different colours detected by said devices;

adding the mean amplitude values associated with a common grain but for first and second different colours to form a first coordinate value;

forming the difference between said mean amplitude values associated with the common grain for said first and second different colours to form a second coordinate value; and repeating said adding and forming steps for other grains and recording said first and second coordinate values for the grains passed through the observation devices.

4. The method as claimed in claim 3 and further comprising:

accumulating first and second coordinate values associated with different grains to define a population map associated with said grains in the supply.

5. An apparatus for sorting granular materials from a supply in accordance with surface characteristics as measured with a plurality of individual grain observation devices, each of which generates amplitude signals related to the intensity of a colour reflected from an individual grain, comprising:

means for combining the amplitude signals associated with a common grain and a common colour thereof to produce mean values for a plurality of colours as detected by said observation devices for the common grain;

means for generating a first coordinate signal representative of the difference between mean values associated with the common grain but different colours; and means for generating a second coordinate signal representative of the sum of the mean values associated with the common grain and with the same different colours used to generate the first coordinate signal.

6. The apparatus of claim 5 and further comprising:

means for generating standard amplitude signals for different colours reflected from a representative grain of the supply;

means for removing, from said mean values, the standard amplitude signals of corresponding colours to produce signals representative of the deviations of the amplitude signals relative to respective standard amplitude signals.

7. A method of sorting a batch of granular material on the basis of the colorimetric characteristics of the grains of said batch observed through a number z of color bands comprising the steps of:

separating said grains from each other;

advancing said grains through an observation area;

observing each said grain with a plurality of n observation devices during passage through the observation area in which a background is placed opposite each observation device so that the said grain passes between each said observation device and its respective background, each said device generating a number z of color signals obtained from each said observation device on passage of each grain;

sampling m times and digitizing the color signals to obtain m values from each color signal;

summing the m values for each color signal to obtain a total number of values equal to the total number z×n of generated color signals;

observing a group of grains that is a representative sample of the batch to generate a mean value of each color signal;

deducting from each said z×n values the mean value of the respective color signa;

processing the sum of the values corresponding to the same color band to obtain a number z of final color coordinate values which represent the colorimetric characteristics of each grain observed through the single color bands and establish a point representative of the colorimetric characteristics of each grain in a cartesian datum system of z coordinates defining a color space;

adding two final color coordinate values when the number z of color bands is two to obtain a number A representative thereof; and subtracting one final color coordinate value from the other to obtain a number C representative thereof, said numbers A and C representing the colorimetric characteristics of each observed grain and establishing a point on a cartersian datum system having first and second coordinates representative of the colorimetric characteristics of each said grain.

8. A method of sorting a batch of granular material on the basis of the colorimetric characteristics of the grains of said batch observed through a number z of color bands comprising the steps of:

separating said grains from each other;

advancing said grain through an observation area;

observing each said grain with a plurality of n observation devices during passage through the observation area in which a background is placed opposite each observation device so that said grain passes between each said observation device and its respective background, each said device generating a number z of color signals obtained from each said observation device on passage of each grain;

sampling m times and digitizing the color signals to obtain m values from each said color signal;

summing the m values for each color signal to obtain a total number of values equal to the total number z×n of generated color signals;

observing a group of grains that is a representative sample of the batch to generate a mean value of each color signal;

deducting from each said z×n values the mean value of the respective color signal;

processing the sum of the values corresponding to the same color band to obtain a number z of final color coordinate values which represent the colorimetic characteristics of each grain observed through the single color bands and establish a point representative of the colorimetric characteristics of each grain in a cartesian datum system of z coordinates defining a color space, an electronic grid composed of a finite number of computer memory cell elements being superimposed on said color space so as to cover the latter completely and in such a way that every point of said color space, as represented by said color coordinates, may be associated with one only of said cells;

supplying said representative sample in the machine;

clearing all said cells;

observing the grains belonging to said sample;

observing and calculating the color coordinate for each said grain; and detecting the cell in said electronic grid which corresponds to said color coordinate and, in such case, increasing by one unit the value contained in that cell so that, upon completion of the observation of said sample, each single cell contains a value equivalent to the number of grains having the colorimetric characteristics corresponding to that cell, whereby in the aggregate said cells in the grid provide statistical information in the form of a population map that is indicative of the distribution of said sample in the color space.

9. The method according to claim 8 wherein the number z of color bands is two so that the color space has two dimensions, the color coordinates, being represented by numbers A and C to defines a cartesian datum system (A, C) so that, upon completion of the observation of said sample, a matrix comprising a population map of said batch is obtained.

10. The method according to claim 9, comprising the steps of:

forming an electronic grid selection map that is superimposed to cover said color space in the same way the population map does;

forming each cell in the selection map so as to take only the value zero or the value one;

classifying an observed grain as acceptable, if the colorimetric characteristics of that grain coincide with a value 0 cell and to be not acceptable if the colorimetric characteristics of that grain coincide with a value 1 cell, said values 0 and 1, depending on a programmed selection standard; and causing an unacceptable grain to be expelled by the sorting machine.

11. The method according to claim 10 which comprises applying grain selection standards that are independent from one another and include:

i. expelling the grains which have an A value higher than a certain predetermined value;

ii. expelling the grains which have an A value lower than a certain predetermined value;

iii. expelling the grains which have a C value higher than a certain predetermined value;

iv. expelling the grains which have a C value lower than a certain predetermined value; and further comprising the steps of:

programming said predetermined values, superimposing the different value 1 cells corresponding to different selection standards, only the cells corresponding to a grain expulsion condition according to the chosen standard being given value 1 automatically in the selection map, the remaining cells being unchanged.

12. The method according to claim 10 which comprises the selection standard of: observing in the observation devices a group of grains considered—to be expelled—, giving value 1 all the cells in the selection map which correspond to the colorimetric characteristics of the grains of said group, automatically expelling all the grains in a batch under sorting which have colorimetric characteristics equivalent to the colorimetric characeristics of the grains of said group.

13. The method according to claim 10 which comprises the selection standard of defining as value 1 cells in the selection map all the cells corresponding to cells in the population map which contain a value lower than a predetermined value, all those grains in a batch under sorting whose presence in said batch is considered too low being so expelled.

14. The method according to claim 10 comprising the steps of: processing the sum of all the cells in the population map which coincide with value 1 cells in the selection map and calculating the equivalent percentage value which provides a statistical forecasting about the number of grains that will be expelled form a batch.

15. A method for sorting granular materials by separating the grains one from another; passing the grains along channel means and in a lit observation cell; repeatedly viewing each grain in z color bands in a group of n observation devices within the lit observation cell when said grain passes in the cell; generating a number z of color signals from each said n observation devices on passage of each grain; sampling m times and numerically converting said z color signals from each grain to obtain m values from each said z color signals; the method being characterized in that it comprises the further steps of: reducing the plurality of signals obtained for each grain into z color coordinates containing the color characteristics of each grain; viewing a group of grains that is a representative sample of a grain batch and generating in an electronic computer a population map having z color coordinates and containing the density of probability of each color coordinate in the grain batch; establishing a selection standard and generating a selection map in z dimensions, which selection map covers the color space defined by said z dimensions, each cell in the selection map taking only the value 0 or the value 1, an observed grain being classified as—acceptable—if its color coordinates coincide with a value 0 cell, an observed grain being classified as—to be expelled—if its color coordinates coincide with a value 1 cell and being expelled by an ejector device in the machine.

16. Method according to claim 15 characterized in that an electronic grid composed by a number of memory cell elements is set in the computer and is superimposed to said color space in such a way that every point of said color space may be associated with one only of said cells, the method comprising the further steps of: after viewing the grains belong to said representative sample, calculating the color coordinate of each viewed grain, detecting that cell in said electronic grid which corresponds to said color coordinate, increasing by one unit the value contained in that cell so that, on completion of viewing said representative sample, each single cell contains a value equivalent to the number of grains having the color characteristics corresponding to that cell, the group of said cells supplying a statistical information about the spreading of said representative sample in said color space.

17. The method according to claim 15 characterized in that said color coordinates, as obtained under the condition that the number z of color signals is 2, are two values which are added one to the other to obtain a number called A and are subtracted one from the other to obtain a number called C, said numbers A, C representing the color characteristics of each viewed grain and esablishing a point in a map having first and second coordinates which are representative of the color characteristics of each said grain.

18. The method according to claim 17 characterized in that, said color space having two dimensions and the color coordinates being represented by said numbers A, C to define a cartersian datum system (A, C), a population map of said grain batch is set up in the memory of the computer.

19. The method according to claim 15 characterized in selection standards that are applicable of:

expelling the grains which have a A value higher than a certain predetermined value, expelling the grains which have a A value lower than a certain predetermined value, expelling the grains which have a C value higher than a certain predetermined value, expelling the grains which have a C value lower than a certain predetermined value, programming said predetermined values, combining at will part or all the above selection standards in order to superimpose the different value 1 cells corresponding to different combined selection standards, only the cells corresponding to a grain expulsion condition according to the chosen standard being given value 1 automatically in the selection map, the remaining cells being unchanged.

20. The method according to claim 15 characterized in that the selection standard is applicable of: viewing a group of grains considered—to be expelled—, giving value 1 all the cells in the selection map which correspond to the color characteristics of the grains of said group, automatically expelling all the grains in a batch under sorting which have color characteristics equivalent to the color characteristics of the grains of said group.

21. The method according to claim 15 characterized in that the selection standard is applicable of: defining as value 1 cells in the selection map all the cells corresponding to those cells in the population map which contain a value lower than a predetermined value, all those grains in a batch under sorting whose presence in the batch is considered too low being so expelled.

22. The method according to claim 15 characterized in that the steps are comprised of: processing the sum of the values of all the cells in the population map which coincide with value 1 cells in the selection map and calculating the equivalent percentage value which provides a statistical forecast about the number of grains that will be expelled from a grain batch.

* * * * *